: 3,272,663
Patented Sept. 13, 1966

3,272,663
WASH-PRIMER COATING INCLUDING MOLYBDATE RADICAL
Max Kronstein, New York, N.Y., assignor to Oakite Products Inc., New York, N.Y., a corporation of New York
No Drawing. Filed Nov. 13, 1962, Ser. No. 237,282
21 Claims. (Cl. 148—6.16)

This invention concerns a new type of so-called "wash-primer" composition. More particularly the invention is that of a film-forming coating composition which, upon being applied to a metal surface, reacts with the metal thereof to form on it an adherent integral complex surface coating comprising certain constituents from the coating composition as well as the principal constituent metal from the metal surface.

More specifically the composition of the invention contains a sparingly soluble in water molybdate-radical yielding inorganic compound dispersed as an insoluble ingredient of a liquid dispersion comprising at least one film-forming reactive resin in a compatible organic liquid dispersion medium for it and inert to the molybdate and the resin.

The invention includes the foregoing film-forming composition containing also a minor quantity of water and dissolved in it a water-miscible substance which provides phosphate ions in an aqueous medium and imparts acidity to it.

Also part of the invention is the method of preparing such compositions as are described in the preceding paragraphs.

Still a further part of the invention is the method of preparing on a basis metal an adherent integral corrosion resistant complex coating containing the principal basis metal together with phosphorus, molybdenum and the metal of the cation of any sparingly soluble in water metal molybdate used as the molybdate-radical yielding compound in the treating composition. This method comprises applying over the surface of the basis metal a wash primer coating in the form of an adequate coating of a composition of the invention, as referred to by the preceding paragraphs of this specification. Thereby, as the applied coating is setting, there apparently occurs some kind of reaction between the molybdate anion, the phosphate anion, and the basis metal of the metal surface, resulting in the formation on it of such complex coating.

Thus, another part of the invention is a basis metal having on an outer surface of it a corrosion resistant complex surface coating containing the basis metal together with phosphorus, molybdenum, and the metal of the cation of any sparingly soluble in water metal molybdate used in the treating composition as the molybdate radical source.

For some time heretofore, generally it was assumed that the chemical interreaction of a metal base pigment within its dispersing medium or vehicle of a film-forming organic coating occurred primarily between such pigment and the vehicle. It was believed that such reactions as the formation of metal-soap-like products from a lead oxide pigment and the linseed oil vehicle occur either in the liquid dispersion or during film-forming or "drying" of the applied coating dispersion, the so-called paint.

Several years ago it was observed that a surface application of a dispersion of zinc oxychromate as the pigment in a solution of a polyvinyl butyral resin dissolved in a mixture of ethyl and butyl alcohols, formed a different coating reaction product when an aqueous solution of phosphoric acid was added to that dispersion, from what formed without adding the phosphoric acid. In other words, these coating dispersions, or so-called "wash-primers" (i.e. containing the phosphoric acid), apparently produced better corrosion resistance than did their corresponding dispersions without phosphoric acid.

In other words, I observed that the application of a coating of a dispersion of zinc oxychromate in a solution of a polyvinyl butyral resin and in presence of phosphoric acid, to a steel surface apparently produces an interreaction between the steel surface and also the applied dispersion.

Thereby a chemical surface reaction product forms, which consists primarily of a complex formation including zinc (from that pigment), iron (from the steel surface), and phosphate (from the phosphoric acid). It may be possible that a certain amount of the organic resin might take part in such a complex formation. That possibly may be so because it has been observed that the chromium (from the oxychromate anion of the zinc oxychromate) is found only in minute amounts in the surface reaction product.

The degree or extent of such complex surface reaction product formation and analysis of the complex coating for its pertinent constituent elements can be accomplished by adequately cleaning away and removing the chemically unreacted part of the applied paint coating, stripping the complex surface reaction product by an acidic stripping agent from the thus uncovered metal, with drying and weighing before and after stripping to enable calculating the coating weight per unit area; and analyzing the resulting stripping solution by an emission spectrometer for content of the individual components of the thus stripped complex surface reaction coating; all by procedures described in my papers "Methods for Investigating the Characteristics of Reactive Coatings" in the October 1959 issue of "Corrosion" pages 18–22 (at p. 18, col. 2 to p. 19, col. 2), and "Studying Organic Coatings," Paint and Varnish Production, vol. 49, No. 1 (January 1959).

In case the reaction after a single application of a wash primer does not produce a heavy enough reaction coating weight to enable attaining satisfactory analysis accuracy, the basis metal can be given two separate, superposed applications of the same test "paint" material, each being followed by the washing away and removal of the chemically unreacted part of the painted on coating; and a third such application followed by similar removal of the unreacted part of the painted on coating can be made thereafter, if necessary.

When the reaction from the application or applications of such pigmented paint material on the surface of the metal has produced a very dense complex reaction coating, no further interreaction will occur between any subsequent application of such paint and the underlying metal surface.

For example, four consecutive applications (each separately followed by the washing off removal of the unreacted part of the applied coating) of the heretofore known suspension of zinc oxychromate in polyvinyl butyral resin solution with added phosphoric acid, and of qualitative and quantitative composition identical to that of Example 1 below but with its zinc molybdate replaced by the same weight of zinc oxychromate, produced on SAE 1010 steel panels a (chemically stripped off) complex surface coating of 48.80 milligrams per square foot (i.e. mg./sq. ft.).

This coating of 48.80 mg./sq. ft. is (a) about the same as the weight of the coating ordinarily resulting from the usual industrial spray method of applications of the customary commercial iron phosphate phosphatizing spray coating, and (b) about one-fourth to one third of the weight of coating from the ordinary commercial zinc phosphate applications.

Yet the presently available iron phosphate and zinc phosphate spray solutions also have their shortcomings in that they not only require special application facilities but also are unsuitable for many applications which for practical use require an effective protective coating treatment.

The compositions and method of the invention avoid shortcomings of the earlier complex coating compositions and enable obtaining by suitably convenient application, protective complex reactive surface coatings at least as heavy and possibly even heavier than those from presently available customary iron phosphate and zinc phosphate phosphatizing solutions, and at the same time also coated over with a primer coat in the form of an organic resin film.

Considered generally, the compositions of the invention comprise as an essential component a sparingly soluble in water inorganic molybdate-radical yielding compound, e.g. molybdic anhydride or acid or such a polyvalent metal molybdate, dispersed, as if it were a pigment, in a liquid dispersion of at least one film-forming resin, advantageously a reactive resin, dissolved or stably dispersed (i.e. colloidally) in a compatible solvent or liquid organic dispersion medium inert to the molybdate and to the resin. In general, the applicable molybdate-radical yielding compounds, such as polyvalent metal molybdates, are sparingly soluble in water (for example, 0.0058 of a part of barium molybdate dissolves in 100 parts of water at 23° C.).

The foregoing essential inroganic molybdate-radical yielding compound and resin dispersion component (conveniently called the "base grind" or "pigment-resin dispersion"), before being used is combined (i.e. admixed) with a so-called activator component. The latter comprises a minor quantity of water (relative to the liquid vehicle of the pigment-resin dispersion) and dissolved in it a substance which provides phosphate ions in an aqueous medium and imparts acidity to it.

While thus far zinc molybdate is the one most extensively used and preferred in this development, other sparingly soluble in water molybdate-radical yielding compounds, for example, molybdic anhydride, molybdic acid, and polyvalent metal molybdates, such as barium, cadmium, lead, nickel, cobalt, copper and chromium molybdates and others, are likewise highly effective to provide, by their application in the combined compositions of the invention and without any required additional processing steps, the desired improved reaction coatings.

The invention may be illustrated by, but not restricted to, the following examples:

*Example 1.—Zinc molybdate, polyvinyl butyral resin, phosphoric acid.*—One hundred grams of polyvinyl butyral resin (Shawinigan Resins Corporation B76–1 of average molecular weight 50,000; average softening point 203° C., specific gravity 1.1, viscosity 175 centipoises in 10% solution in 95% ethanol at 25° C. in the Ostwald viscosimeter, volatile 5%) were dissolved in 680 grams of 95% ethanol admixed with 221 grams of n-butyl alcohol, in a ball mill. Then 96.4 grams of zinc molybdate were added and 14.3 grams of magnesium silicate (3X) as an extender pigment and 1.1 grams of lampblack for coloring; and the mill rotated to work these pigments into homogeneous dispersion, thereby to provide what conveniently can be called the "base grind" or "pigment-resin dispersion."

Then the activator solution (the source of phosphate ion and of acidity) was prepared by mixing 50 grams of 85% phosphoric acid into 182 grams of 95% ethanol diluted with 44.6 grams of water.

The foregoing preliminary base grind or pigment-resin dispersion and the activator were admixed thereby to make available the finished or activated film-forming composition of the invention, ready for application to steel or other metal surfaces.

SAE 1010 steel test panels dipped into this activated film-forming composition of Example 1 in a dip coater were allowed to dry for 4 minutes. The unreacted organic part of the resulting dry coating then was removed by being washed off with "Cellosolve" as described in my above-referred to article in "Corrosion."

Then the weight of the complex integral deposit (determined by the method also described in that article) was found to be 109.27 mg./sq. ft. That is 2.24 times the weight of 48.8 mg./sq. ft. for the deposit produced by four consecutive applications of the exactly corresponding activated composition wherein the zinc molybdate of Example 1 was replaced by its same weight of zinc oxychromate (more closely designated as zinc tetra oxychromate).

Other such 1010 steel panels given four consecutive applications (with intermediate washing off of the unreacted organic part of the dry coating) of the activated film-forming composition of Example 1, showed a weight of 145.4 mg./sq. ft. for the complex integral deposit. That is practically 3 (i.e. 2.98) times the foregoing weight of deposit produced by that exactly corresponding activated composition containing zinc tetra oxychromate in place of the zinc molybdate in the composition of the invention of Example 1.

It is also part of this development that part of the sparingly water soluble molybdate, such as the zinc molybdate of Example 1, can be replaced by a double chromate such as barium potassium chromate, for example, as illustrated as follows:

*Example 2.—Zinc molybdate, barium potassium chromate, polyvinyl butyral resin, phosphoric acid.*—(a) The preparation of the base grind or pigment-resin dispersion of Example 1 was repeated without change except to replace half (i.e. 48.2 grams) of its zinc molybdate by 48.2 grams of barium potassium chromate.

The thus resulting modified pigment-resin dispersion then was admixed with the same activator solution of Example 1. Thereby there was prepared a thus modified activated film-forming composition of the invention, similarly ready for application to steel or other metal surfaces.

SAE 1010 steel test panels similarly dipped into this activated film-forming composition of Example 2 and dried, after similar removal of the unreacted organic part of the dried coating, took on a uniformly adherent complex integral deposit. It weighed 113.1 mg./sq. ft., i.e. after merely a single application of this activated coating composition of Example 2(a).

Other such 1010 steel panels given four consecutive applications (with intermediate washing off of the organic part and drying) of this activated film-forming composition of Example 2(a) showed a weight of 178.0 mg./sq. ft. for the resulting complex integral deposit. That is 22.4% higher than the complex deposit weight produced by the four consecutive applications of the activated composition of Example 1.

(b) Upon replacing the 48.2 grams of zinc molybdate used in Example 2(a) by 48.2 grams of zinc tetra oxychromate and repeating the preparation steps of Example 2(a), and similarly giving SAE 1010 steel panels similar four consecutive applications of the resulting activated film-forming composition (thus containing zinc tetra oxychromate and barium potassium chromate and no zinc molybdate), the complex integral deposit thus obtained showed a weight of 60.0 mg./sq. ft. That is 22.95% higher than what was obtained when 96.4 grams of zinc tetra oxychromate was used without barium potassium chromate.

The polyvinyl butyral resin of Examples 1 and 2 can be replaced by any other film-forming resin, particularly a such reactive resin, soluble (i.e. truly or even to colloidal solution) in a water-miscible solvent or mixture of them and stable as to its film-forming capacity in presence of water-soluble phosphates and under aqueous acid conditions. Thus, for the ethanol (in either part) or n-butanol, other water-miscible organic solvents such as acetone, methyl, ethyl ketone, propanol, isopropanol, dioxane, ethylene glycol, polyethylene glycol, or polyethylene oxide, and the like can be used, depending on which alone or in admixture dissolves the particular resin or mixture of such resins.

The zinc molybdate of either of Examples 1 and 2(a) can be replaced in part or as a whole by any other sparingly water-soluble polyvalent metal molybdate. Thus, these specific examples can be taken as if repeated in full with their zinc molybdate replaced in part or by the same weight of, for example, barium, cadmium, chromium, cobalt, copper, lead, or nickel molybdate respectively, thereby to have prepared the corresponding pigment-resin dispersion having some one of these molybdates or a mixture of any of them instead of the zinc molybdate.

Any sparingly water-soluble metal molybdate which may not yet be easily obtainable in commercial production quantities, is prepared readily by reacting a water-soluble salt of the metal whose sparingly water-soluble molybdate is desired, such as the chloride of such metal, by admixing an aqueous solution of it with sufficient of an aqueous solution of a water-soluble molybdate such as an alkali metal (e.g. sodium or potassium) or ammonium molybdate. The desired sparingly water-soluble metal molybdate which precipitated out then is filtered off and dried in a drying oven for sufficient time to dry it.

The applicable sparingly water-soluble molybdates generally are soluble in water to significantly under a few percent, ordinarily under about a couple of percent, and more usually under about one percent, at about 20–25° C. About the same may be said as to the sparingly soluble mixed metal chromates, e.g. barium potassium chromate or barium ammonium chromate.

Any of the foregoing examples and any of the possible modifications of them is to be considered as showing also the preparation of the respective pigment-resin dispersion without any extender pigment, e.g. magnesium silicate, and/or without any added colored pigment. The extender pigment, such as magnesium silicate, can be replaced by any other suitably finely divided clay thickener, for example, finely divided attapulgite clay.

The phosphoric acid in any of the examples or modifications of any of them can be replaced by any alkali metal or ammonium dihydrogen phosphate, or sufficient quantity of an alkyl acid phosphate, each of which makes the aqueous activator acid, i.e. with pH under 7.

Such alkyl acid phospates can be used in their presently more readily available form as a mixture of approximately equimolar quantities of a monoalkyl acid phosphate and dialkyl acid phosphate having the particular alkyl radical. The generally more applicable of these alkyl acid phosphates are the lower alkyl phosphates having from one to eight carbon atoms in the alkyl chain, such as the methyl, n-propyl, n-butyl, amyl, and 2-ethylhexyl acid phosphates.

Thus, any of the foregoing applicable inorganic or organic phosphate-group containing substances are referred to broadly as a water-soluble substance which provides phosphate ions and thus imparts acidity to water; or otherwise is called a water-soluble activator acid providing phosphate ions.

Inclusion of such aqueous activator acid substance yielding phosphate ions in compounding the activated film-forming composition gives the latter a pH under pH 7. However, present indications are that it is best to include sufficient of the aqueous activator acid to give the activated composition a pH of from about 2 to about 4. In any event, the quantity of the phosphate ion yielding activator acid should be at least sufficient for the resulting complex surface coating to be adherent and non-flaking.

In any of the Examples 2(a) and 2(b) or any modifications of either of them, the barium potassium chromate can be replaced by any other barium alkali metal chromate such as barium sodium chromate, or by barium ammonium chromate.

The respective quantities of the various substances in the several examples and the recited possible modifications of them can be changed so long as the relative proportions allow the aqueous portion to remain acid and keep the resin stably suspended and enable application of a satisfactory continuous film-coating of the composition. Thus, the proportion of water in the activator solution to the total amount of organic solvent in the final activated film-forming composition is below that which could cause the reactive resin to precipitate or destroy its film-forming capacity.

*Example 3.—Molybdic anhydride, polyvinyl butyral resin, phosphoric acid.*—One hundred grams of polyvinyl butyral resin (Shawinigan B76–1 as in Example 1) were dissolved in 680 grams of 95% ethanol admixed with 221 grams of n-butanol in a ball mill. Then 96.4 grams of molybdic anhydride (i.e. $MoO_3$) were added with 14.3 grams of magnesium silicate (3X) as an extender pigment, and the mill rotated to work these pigments into homogeneous dispersion, as in Example 1, to provide the base grind or pigment-resin dispersion.

The activator solution then was prepared by mixing 50 grams of 85% phosphoric acid into 182 grams of ethanol diluted with 44.6 grams of water. This activator solution and the foregoing pigment-resin dispersion were admixed thereby providing the activated film-forming composition ready for application to steel or other metal surfaces.

SAE 1010 steel test panels were dipped into this finished film-forming composition in a dip coater and allowed to dry for at least 4 minutes. The dried resinous film coating was similar to those prepared, say, as in Example 1, but of lighter color because the lampblack was omitted. Rubbing off with ethanol, the ethanol soluble organic portion of this resinous coating film exposed underneath a good appearing reaction complex coating on the steel.

Any polyvalent metal molybdate used according to Example 1 or 2(a) can be replaced by an equivalent or other suitable quantity of this molybdic anhydride (0.1066 of a part soluble in 100 parts of cold water) or a similar quantity of molybdic acid (i.e. $H_2MoO_4 \cdot 2H_2O$). So also, the molybdic anhydride of Example 3 can be replaced similarly by molybdic acid or any sparingly soluble in water polyvalent metal molybdate such as mentioned hereinabove as well as calcium molybdate or strontium molybdate which likewise can be used as in Examples 1 and 2(a).

As already idicated, the specific polyvinyl butyral resin as the reactive resin can be replaced by any other reactive resin of similar character, such as a polyvinyl acetal resin as also polyvinyl formal resin.

Preferably the solvent or other dispersion medium selected for stably dispersing the resin for the base grind, i.e., pigment-resin dispersion, as well as any organic solvent admixed with the water in the activator solution, should provide a final dispersion medium compatible with the water in the quantity of activator acid solution to be used. Any one with ordinary skill in the art readily would know which organic solvents to use to dissolve or colloidally disperse the specifically selected water-insoluble film-forming reactive resin, guided by those mentioned above.

The film-forming reactive resin of the composition of the invention is itself water-insoluble. Accordingly, the coating remaining on the surface coated by the activated composition of the invention, after evaporation of the solvents, is a water-insoluble film.

The worker of ordinary skill in this art readily can understand which organic solvents in the liquid dispersion for the film-forming reactive resin are inert to the sparingly water-soluble inorganic molybdate-radical yielding compound, such as molybdic acid or polyvalent metal molybdate, and to the resin. Thus, such compatible predominately organic liquid dispersion is inert to the molybdate-radical yielding compound other than serving as a suspending medium for it, and is inert to the water-insoluble film-forming reactive resin other than serving as a dispersing agent or solvent for it.

It is advantageous that these activated film-forming compositions be used within about eight hours or so after admixing the pigment-resin dispersion and activator solution.

The activated film-forming compositions of the invention are applicable beneficially not only to ferrous metal surfaces but also to those of non-ferrous metals such as aluminum, magnesium, zinc, cadmium, and alloys of such metals. These activated compositions can be applied by any of the convenient methods of applying lacquers or paints, for example, by dipping (i.e., immersion), spraying or brushing, or even by rollers or sponges.

The phosphorus, molybdenum, and with or without zinc, in the adherent integral complex surface coating on the basis metal of the hereinabove described coated SAE 1010 steel test panels, occur therein in greater proportion to the iron content of the original panel than any such phosphorus, molybdenum or zinc which may be present in the original panel basis metal as an original impurity or deliberate additive introduced in production of that steel to give it any specific properties as a specific steel.

Thus, the finished metal product having the adherent integral complex surface coating applied to it according to this invention, is a metal product consisting essentially of a basis metal and an adherent integral complex surface coating on a surface of it, which coating comprises the primary metal (such as the ferrous metal, or non-ferrous metal or alloy as just above referred to) containing phosphorus, molybdenum, and with or without zinc, each in its individually higher ratio to the primary metal in the basis metal than any such phosphorus, molybdenum or zinc respectively contained in the main body of the basis metal.

Metal surfaces coated with the resulting film-covered integral complex deposit produced by application of the activated compositions of the invention exhibit very satisfactorily high corrosion resistance as seen by salt spray tests and do so also even with the resin film removed leaving solely the adherent integral complex coating.

While the activated film-forming compositions of the invention are more suitable for application to metal surfaces, they can be applied also to such surfaces as wood, glass and other ceramics, leather and even non-cellulosic fabrics, even though no interreaction occurs with such surfaces to form any complex surface deposit.

No specific range need be given for the particle size of the finely divided molybdate-radical yielding compound. Its specific particle size may be influenced by the end characteristics contemplated for the dried applied film of the film-forming composition, as well as by the planned surface finish appearance for any finish coat which is to be placed over the dried "wash primer" coating. If a smooth final surface is desired, a person with ordinary skill in the art would be able to judge about what range of particle size to use. However, if a coarse final finish were desired, a correspondingly larger particle size of the finely divided pigment may be used.

Similarly, there can be no fixed range for the concentration of the film-forming resin, for that too would be influenced by the ultimate general characteristics of the planned final coating. That too can be determined within the judgment of a worker of ordinary skill in such coating art, starting with the understanding that the film-forming resin should be present in a concentration at least sufficient to provide an adequately adherent continuous film after the solvent has been evaporated off.

So also, no specific range can be given for the quantity of the volatile organic solvent or mixed solvents used for dissolving or at least stably dispersing the film-forming resin. The quantity of such solvent or dispersion vehicle should be at least sufficient to dissolve or hold the film-forming resin stably dispersed in the initial base grind (or pigment-resin dispersion) and to keep the resin dissolved or stably dispersed when the base grind is admixed with the activator solution (containing the water-soluble phosphate-ion compound to provide the acidity).

The organic solvent dispersion vehicle for the film-forming resin is referred to as volatile herein and in the depending claims to inform the person of ordinary skill in this art that it is volatile from the film of wash-primer composition applied to the metal or other surface to be coated with it, under the ambient conditions prevailing when it is applied or volatile under the ordinary elevated temperatures to which any such coating films ordinarily might be subjected in hot air blast or tunnel drying or similar drying operations to which resin film coated metal or other surfaces ordinarily are subjected.

The ethanol in the activator solution of the examples serves to enhance the complete miscibility of its aqueous dissolved content of the phosphate-ion providing compound with the base grind (or pigment-resin dispersion) when that compound in aqueous solution otherwise is immiscible with the volatile organic solvents of the pigment-resin dispersion. The ethanol admixed with the aqueous solution of the phosphate-ion yielding compound serves also to enhance the evaporation of its water from the applied film of the final activated composition. That ethanol then can be replaced in whole or in part by any other adequately water-miscible oxygen-containing lower aliphatic organic solvent, for example, the alkanols having less than five carbon atoms, miscible with the solvent used for dissolving or stably dispersing the film-forming resin and compatible with it.

Thus, when the aqueous solution of the phosphate-ion providing compound is readily miscible with the solvent medium for the film-forming resin, the quantity of ethanol or other lower alkanol through butanol admixed with that aqueous solution can be reduced, and even omitted, when the solvent medium for the resin contains a constituent that can enhance the evaporation of the water from the applied film similarly to how ethanol does.

Ordinarily the quantity of the aqueous solution of the phosphate-ion providing compound is a minor portion of the entire activated complex coating composition, and so also is any activator solution wherein the aqueous solution of the phosphate-ion providing compound is admixed in ethanol or other such solvent. In any event, the quantity of the specific activator solution added to the pigment-resin dispersion should be at least sufficient for the resulting activated complex coating composition to remain acid while the metal surface to be coated by it is subjected to contact with the coating composition. The quantity of the activator solution used generally is less than that of the pigment-resin dispersion, whether by weight or volume.

While the invention has been explained more fully by detailed description of certain specific embodiments of it, it is understood that various modifications and substitutions may be made in them within the scope of the appended claims which are intended to cover also equivalents of the specific embodiments.

What is claimed is:

1. A film-forming pigment-and-resin-containing base grind composition comprising a finely divided sparingly soluble in water molybdate-radical-providing inorganic compound incorporated in a liquid dispersion of a film-forming organic reactive resin in a predominately organic water-miscible volatile solvent vehicle for it; said resin being water-insoluble and soluble in a water-miscible organic solvent and stable as to its film-forming capacity in the presence of phosphate ions under aqueous acid conditions; said resin and the volatile solvent water-miscible vehicle for it being so proportioned to one another to enable the resin to remain stably suspended and to allow applying to a surface a satisfactory continuous film-coating of the resulting activated film-forming composition when said base grind composition has admixed with it a minor amount of water having dissolved in it a water-soluble compound which provides phosphate ions therein and imparts acidity thereto.

2. A film-forming composition as claimed in claim 1, wherein the molybdate-radical-providing compound is a polyvalent metal molybdate.

3. A composition as claimed in claim 2, wherein the metal molybdate is zinc molybdate.

4. A composition as claimed in claim 3, wherein the resin is a polyvinyl butyral resin.

5. A composition as claimed in claim 1, wherein the resin is a member of the class consisting of polyvinyl formal, polyvinyl acetal, and polyvinyl butyral.

6. A composition as claimed in claim 2, wherein there is incorporated in the dispersion also a finely divided sparingly water-soluble mixed-cation chromate of the class consisting of an alkaline earth metal alkali metal chromate and an alkaline earth metal ammonium chromate.

7. A composition as claimed in claim 6, wherein the molybdate is zinc molybdate and the alkaline earth metal cation of said chromate is barium.

8. A composition as claimed in claim 7, wherein the chromate is barium potassium chromate.

9. An activated film-forming composition comprising a finely divided sparingly soluble in water molybdate-radical-providing inorganic compound incorporated in the dispersion of a film-forming organic reactive resin in a compatible vehicle for it and containing at least one volatile water-miscible organic solvent and stably admixed with it a minor amount of water and a dissolved water-soluble compound which provides phosphate ions therein and imparts acidity thereto; said resin being water-insoluble and soluble in a water-miscible organic solvent and stable as to its film-forming capacity in the presence of phosphate ions under aqueous acid conditions; the ratio of water to organic solvent for the resin being low enough to avoid precipitating the resin and destroying its film-forming capacity; and said molybdate-radical-providing compound and phosphate-ions-providing compound being used in such proportions for the composition to impart corrosion resistance to the metal surface to which it is applied and to allow the applied coating to be adherent and non-flaking.

10. A composition as claimed in claim 9, wherein the molybdate-radical-providing compound is a polyvalent metal molybdate.

11. A composition as claimed in claim 10, wherein the molybdate is zinc molybdate.

12. A composition as claimed in claim 9, wherein the resin is a polyvinyl butyral resin and the solvent for it is at least one volatile oxygen-containing aliphatic solvent at least some portion of which is water-miscible.

13. A composition as claimed in claim 9, wherein the phosphate ion-providing substance is a member of the class consisting of phosphoric acid, an alkali metal dihydrogen phosphate, ammonium dihydrogen phosphate, and a water-soluble alkyl acid phosphate.

14. A composition as claimed in claim 9, wherein also incorporated in the dispersion of the film-forming resin is a finely divided sparingly water-soluble inorganic mixed-cation chromate of the class consisting of an alkaline earth metal alkali metal chromate and an alkaline earth metal ammonium chromate.

15. A composition as claimed in claim 14, wherein the molybdate-radical-providing compound is a polyvalent metal molybdate and the alkaline earth metal cation of the chromate is barium.

16. The method of preparing an activated film-forming coating composition which upon application to a metal surface reacts to form on it a complex reaction coating containing metal elements of ingredients of the composition, which method comprises (a) preparing a pigment-resin base grind dispersion by incorporating a finely divided sparingly soluble in water, molybdate-radical-providing inorganic compound in a dispersion of a film-forming organic reactive resin in a water-miscible organic solvent vehicle for it; (b) preparing an activator solution by dissolving in an aqueous medium miscible with said solvent vehicle a substance which provides phosphate ions in said solution and imparts acidity to it; and (c) admixing the pigment-resin dispersion and activator solution in such proportions that the water is a minor part of the coating composition and insufficient to throw any of the resin out of solution; said resin being water-insoluble and soluble in a water-miscible organic solvent and stable as to its film-forming capacity in the presence of phosphate ions under aqueous acid conditions; and said molybdate-radical-providing compound and phosphate-ions-providing compound being used in such proportions for the composition to impart corrosion resistance to the metal surface to which it is applied and to allow the applied coating to be adherent and non-flaking.

17. The method as claimed in claim 16, wherein the molybdate-radical-providing compound is a polyvalent metal molybdate.

18. The method as claimed in claim 16, wherein the water-miscible solvent vehicle for the resin is a member of the class consisting of the water-miscible aliphatic alcohols and ketones, ethylene glycol, polyethylene glycol, polyethylene oxides, and dioxane, and a mixture of any of them.

19. The method as claimed in claim 18, wherein the resin is a polyvinyl butyral resin and the solvent for it is a mixture of ethanol and n-butanol; and the substance which provides phosphate ions is a member of the class consisting of orthophosphoric acid, an alkali metal dihydrogen phosphate, ammonium dihydrogen phosphate, and a water-soluble alkyl acid phosphate; and said phosphate ion-providing substance is dissolved in the activating solution in ethanol diluted with a minor amount of water sufficient for the quantity of said substance to ionize to provide phosphate ions therein.

20. The method of preparing on a metal surface an adherent integral reactant complex coating, which method comprises applying to the metal surface a coating of an activated film-forming composition as claimed in claim 9, and allowing the applied coating to dry thereon, whereby there is produced on the metal surface an adherent integral reactant complex coating containing the basis metal, phosphorus, molybdenum, and any polyvalent metal which is the cation of any polyvalent metal molybdate in said composition.

21. A metal product consisting essentially of a basis metal with at least part of its surface coated with an adherent integral complex surface coating composed of an inorganic and an organic portion, the inorganic portion of which consists essentially of the principal metal constituent of the basis metal of the product, and the elements phosphorus, zinc and molybdenum, each of the latter three being present in the surface coating in its individually respective ratio to the principal metal of the basis metal greater than the respective ratio of any phosphorus, zinc and molybdenum originally present in the basis metal to the principal metal of the basis metal; and said organic portion is a dry, continuous film of a film-forming reactive resin member of the class consisting of polyvinyl formal, polyvinyl acetal, and polyvinyl butyral.

(References on following page)

References Cited by the Examiner

UNITED STATES PATENTS

| | | | |
|---|---|---|---|
| 2,502,441 | 4/1950 | Dodd et al. | 148—6.15 |
| 2,525,107 | 10/1950 | Whiting et al. | 148—6.16 |
| 2,557,509 | 6/1951 | Miller | 148—6.15 X |
| 2,692,840 | 10/1954 | Bell | 148—6.16 |
| 2,839,438 | 6/1958 | Rosenbloom | 148—6.15 |
| 2,839,439 | 6/1958 | Stapleton | 148—6.15 |
| 2,868,679 | 1/1959 | Pimbley | 148—6.2 |
| 2,886,477 | 5/1959 | Smith | 148—6.15 |
| 3,136,663 | 6/1964 | McDonald | 148—6.15 |

OTHER REFERENCES

Schoen et al.: Official Digest Federation of Societies for Paint Technology, vol. 32, #430, November 1960, pp. 1522–1943, TP 934 F 29, Scientific Library.

MURRAY KATZ, *Primary Examiner.*

RICHARD D. NEVIUS, *Examiner.*

R. S. KENDALL, *Assistant Examiner.*